United States Patent
Teboulle

(10) Patent No.: US 11,516,561 B2
(45) Date of Patent: Nov. 29, 2022

(54) METHOD FOR READING FLUID METERS

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 17/605,655

(22) PCT Filed: Apr. 16, 2020

(86) PCT No.: PCT/EP2020/060723
§ 371 (c)(1),
(2) Date: Oct. 22, 2021

(87) PCT Pub. No.: WO2020/216671
PCT Pub. Date: Oct. 29, 2020

(65) Prior Publication Data
US 2022/0224995 A1    Jul. 14, 2022

(30) Foreign Application Priority Data
Apr. 23, 2019 (FR) ...................... 1904276

(51) Int. Cl.
*H04Q 9/00* (2006.01)
*G01F 15/063* (2022.01)

(52) U.S. Cl.
CPC ............ *H04Q 9/00* (2013.01); *G01F 15/063* (2013.01); *H04Q 2209/40* (2013.01); *H04Q 2209/60* (2013.01); *H04Q 2209/753* (2013.01)

(58) Field of Classification Search
CPC .. H04Q 9/00; H04Q 2209/40; H04Q 2209/60; H04Q 2209/753; G01F 15/063
See application file for complete search history.

(56) References Cited

U.S. PATENT DOCUMENTS 9,408,251 B2 * 8/2016 Grady ................. H04L 67/12
9,664,531 B2 * 5/2017 Le Buhan ........... H04L 9/3247
(Continued)

FOREIGN PATENT DOCUMENTS

EP    1608200 A1    12/2005

OTHER PUBLICATIONS

May 28, 2020 International Search Report issued in International Patent Application No. PCT/EP2020/060723.

*Primary Examiner* — Amine Benlagsir
(74) *Attorney, Agent, or Firm* — Oliff PLC

(57) ABSTRACT

The automated remote reading of fluid meters implemented in a system includes fluid meters, each measuring a consumption of fluids, and at least one gateway. Each gateway can exchange frames in accordance with a wireless communication standard with a plurality of meters via a first communication network, and to communicate with a management entity responsible for processing, in a centralised manner, information representing a consumption of fluids, referred to as readings, coming from meters via a second network. The method comprises for each gateway: defining meter reading periods for a set of meters paired with said gateway, the gateway being on standby outside each period and awake during each period; successively interrogating each meter in said set during each period in order to obtain a reading, each meter waking up at the start time of each period and going on standby as soon as it has transmitted a reading.

11 Claims, 6 Drawing Sheets

(56) References Cited

U.S. PATENT DOCUMENTS

| | | | | |
|---|---|---|---|---|
| 10,178,016 | B1* | 1/2019 | Hall | H04L 43/50 |
| 2010/0278187 | A1* | 11/2010 | Hart | H04L 67/12 |
| | | | | 370/469 |
| 2011/0303310 | A1* | 12/2011 | Klicpera | B05B 12/008 |
| | | | | 137/551 |
| 2011/0303311 | A1* | 12/2011 | Klicpera | G01F 15/0755 |
| | | | | 137/551 |
| 2012/0056755 | A1* | 3/2012 | Hanft | H04Q 9/00 |
| | | | | 340/870.07 |
| 2014/0028465 | A1* | 1/2014 | Cornwall | G01D 4/002 |
| | | | | 340/870.02 |
| 2014/0028469 | A1* | 1/2014 | Ali | H04Q 9/00 |
| | | | | 340/870.03 |
| 2015/0195394 | A1* | 7/2015 | Bietz | H04M 1/72412 |
| | | | | 455/419 |
| 2017/0019248 | A1* | 1/2017 | Mustafa | H04L 9/008 |
| 2018/0041994 | A1* | 2/2018 | Zhang | H04W 12/06 |
| 2018/0373304 | A1* | 12/2018 | Davis | G06F 1/3206 |

* cited by examiner

METHOD FOR READING FLUID METERS

TECHNICAL FIELD

The present invention relates to a method for the automated remote reading of fluid meters such as water or gas meters, as well as a system and devices implementing said method.

PRIOR ART

For reasons of efficiency and rationalisation, electricity, gas and water suppliers have sought to automate the reading of the consumptions of their customers, avoiding recourse to travel by operators to make the readings. Electricity distribution networks are particularly suitable for automated remote readings of electricity meters since they offer an infrastructure allowing powerline communications. Water and gas distribution infrastructures cannot, for their part, serve as a communication infrastructure. Despite everything, the trend for rationalising readings has also affected gas and water suppliers. Gas and water meters, hereinafter referred to as fluid meters, have become smart and solutions allowing automatic remote reading of these meters have been developed. These solutions rely in particular on the WM-Bus ("Wireless Meter Bus") communication standard. The WM-Bus standard (NF EN 13757-4, "Communication systems for meters and remote reading of meters—Part 4: Wireless meter readout (Radio meter reading for operation in SRD bands)" is a wireless communication standard offering an excellent compromise between small antenna size and long range both indoors and outdoors (up to 1 km without repeaters). Having a bidirectional character, the WM-Bus standard allows remote actions by a control centre. Deploying a WM-Bus communication infrastructure requires installing a modem with a long battery life (up to 12 years for a lithium supply) on each fluid meter and a central concentrator (1 central concentrator per building of 6 to 7 storeys on average) that fulfils a role of gateway responsible for collecting the information read and transmitting it to a management entity.

In current architectures for reading fluid meters, the fluid meters are generally unidirectional (they can only send data but cannot receive them) and send a frame containing information representing a fluid consumption that they measure every fifteen seconds to the gateway to which they are attached. For the purpose of reducing the energy consumption of the gateways, the latter are for the most part of the time in a low energy consumption mode, referred to as standby mode. They go into a more energy consuming mode, referred to as awake mode, only once a day for a period of predefined duration P. The predefined duration P is in general equal to two minutes. The fluid meters are not informed of the start of the awake period of the gateway, which obliges them to be awakened at least every fifteen seconds in order to be certain of sending their information representing a fluid consumption at least twice during the awake period of the gateway to which they are attached. This has the major drawback of consuming a great deal of energy at the fluid meters, which must transmit very often. In addition, since the fluid meters are not synchronised with one another, there exists a high risk of collisions between the frames sent by the fluid meters.

It is therefore desirable to overcome these drawbacks of the prior art. It is in particular desirable to propose a method for collecting information representing fluid consumptions measured by a plurality of meters not involving excessive energy consumption at the fluid meters. It is moreover desirable for this method to make it possible to limit, or even prevent, the collisions between the frames sent by the fluid meters of the plurality of fluid meters.

DISCLOSURE OF THE INVENTION

According to a first aspect of the invention, the invention relates to a method for the automated remote reading of fluid meters implemented in a system comprising a plurality of fluid meters, referred to as meters, each measuring a fluid consumption, and at least one gateway, each gateway being able to exchange frames in accordance with a wireless communication standard with a plurality of meters via a first communication network, and to communicate with a management entity responsible for processing in a centralised manner information representing a fluid consumption, referred to as readings, coming from meters via a second network. The method comprises, for each gateway: obtaining at least one ordered list of meters paired with said gateway, each meter in each list having been paired by gateway, by implementing a pairing procedure during which the gateway sent to each meter a frame, referred to as a synchronisation frame, each synchronisation frame comprising for each list timestamp information enabling the time of said meter to be set and information representing one and the same start time of a next period of reading meters by said gateway, the gateway being on standby outside each reading period, each meter waking up at said start time indicated in the synchronisation frame; for each list and during each reading period corresponding to said list: going into active mode and running through said list in order, and, for each meter: sending a synchronisation frame to said meter, the start time, referred to as the next start time, contained in said synchronisation frame being identical for each meter in the list; following reception of an acknowledgement for the synchronisation frame, sending a frame requesting said meter to provide a reading; and passing to the following meter in said list following reception of a frame, referred to as a reading frame, containing the requested reading, each meter going on standby following the sending of the reading frame; and going on standby following the running through of said list until the next start time.

According to one embodiment, when at least one meter in a list does not send an acknowledgement following a sending of a synchronisation frame intended for this meter and/or does not send a reading frame following the sending of a frame requesting sending a reading intended for this meter, following the running through of the ordered list, the gateway sends at least one synchronisation frame in broadcast mode, each meter remaining awake as long as a condition of putting said meter on standby is not respected, the condition of putting said meter on standby being respected when said meter receives a synchronisation frame.

According to one embodiment, the synchronisation frame serves as a frame requesting sending a reading and the reading frame serves as an acknowledgement frame.

According to one embodiment, the gateway modifies the order of the meters in each list at each meter reading period so as to balance the wake-up time of said meters.

According to one embodiment, when a meter in a list does not return an acknowledgement following a sending of a synchronisation frame intended for this meter and/or does not return a reading frame following the sending of a frame requesting supplying a reading intended for this meter over a predefined number of consecutive meter reading periods, the gateway considers that the pairing procedure must be reapplied for this meter.

According to a second aspect of the invention, the invention relates to a device of the gateway type making it possible to remotely read fluid meters in an automated manner in a system comprising a plurality of fluid meters, referred to as meters, each measuring a fluid consumption, said device being able to exchange frames according to a wireless communication standard with a plurality of meters via a first communication network, and to communicate with a management entity responsible for processing in a centralised manner information representing a consumption of fluids, referred to as readings, coming from meters via a second network. The device comprises: obtaining means for obtaining at least one ordered list of meters paired with said gateway, each meter in each list having been paired by implementing a pairing procedure during which said device sent to each meter a frame, referred to as a synchronisation frame, each synchronisation frame comprising for each list timestamp information enabling the time of said meter to be set and information representing one and the same start time of a next period of reading meters by said device, said device being on standby outside each reading period, each meter waking up at said start time indicated in the synchronisation frame; means implemented for each list and during each reading period corresponding to said list comprising: control means for going into active mode and running-through means for running through said list in order, and, for each meter: communication means for sending a synchronisation frame to said meter, the start time, referred to as the next start time, contained in said synchronisation frame being identical for each meter in the list; communication means for receiving an acknowledgement for the synchronisation frame, and communication means for sending a frame requesting said meter to provide a reading, following a reception of an acknowledgement; communication means for receiving a frame, referred to as a reading frame, containing a requested reading; and control means for passing to the following meter in said list following a reception of a reading frame, each meter going on standby following the sending of the reading frame; and control means for going on standby following the running through of said list until the next start time.

According to a third aspect of the invention, the invention relates to a method for the automated remote reading of fluid meters implemented in a system comprising a plurality of fluid meters, referred to as meters, each measuring a fluid consumption, and a gateway, the gateway being able to exchange frames according to a wireless communication standard with the plurality of meters via a first communication network, and to communicate with a management entity responsible for processing in a centralised manner information representing a fluid consumption, referred to as readings, coming from meters via a second network, the gateway defining meter reading periods during which it performs meter readings, characterised in that the method comprises, for each meter and each meter reading period: obtaining a first start time of a meter reading period, the first time having been obtained when a synchronisation frame is received, each synchronisation frame comprising timestamp information enabling the time of said meter to be set and information representing a start time of a next period of reading meters by the gateway, said time being identical for a set of meters in an ordered list of meters paired with said gateway, each synchronisation frame having been transmitted either during the implementation of a procedure of pairing between the meter and said gateway, or during a previous meter reading period; waking up at the first start time; in the event of reception of a synchronisation frame, keeping the start time, referred to as the second start time, indicated in the synchronisation frame and transmitting an acknowledgement to the gateway for said synchronisation frame; in the event of reception of a frame requesting said meter to provide a reading, sending to the gateway a frame, referred to as a reading frame, containing the requested reading, the time of sending the synchronisation frame and the frame requesting providing a reading in the meter reading period being dependent on a position of said meter in the ordered list; and going on standby following the sending of the reading frame until the second start time.

According to one embodiment, if the fluid meter receives a frame requesting said meter to provide a reading without previously having received a synchronisation frame, the meter remains awake as long as a condition of putting on standby is not respected, the condition of putting on standby being respected when said meter receives a synchronisation frame sent in broadcast mode by the gateway.

According to a fourth aspect of the invention, the invention relates to a device of the fluid meter type, referred to as a meter, included in a system comprising a plurality of meters each measuring a fluid consumption, and a gateway, the gateway being able to exchange data according to a wireless communication standard with the plurality of meters via a first communication network, and to communicate with a management entity responsible for processing in a centralised manner information representing a fluid consumption, referred to as readings, coming from meters via a second network, the gateway defining meter reading periods during which it makes meter readings. The device comprises: obtaining means for obtaining a first start time of a meter reading period, the first time having been obtained when a synchronisation frame is received, each synchronisation frame comprising timestamp information enabling the time of said device to be set and information representing a start time of a next period of reading meters by the gateway, said time being identical for a set of meters in an ordered list of meters paired with said gateway, each synchronisation frame having been transmitted either during the implementation of a procedure of pairing between the device and said gateway, or during a previous meter reading period; control means for waking up the device at the first start time; communication means for receiving a synchronisation frame; storage means for storing a start time, referred to as a second start time, indicated in a synchronisation frame, and communication means for transmitting an acknowledgement to the gateway in the event of reception of a synchronisation frame; communication means for receiving a frame requesting said device to provide a reading; communication means for sending to the gateway a frame, referred to as a reading frame, containing a reading in the event of reception of a frame requesting said device to provide a reading, the time of sending the synchronisation frame and the frame requesting providing a reading in the meter reading period being dependent on a position of said device in the ordered list; and control means for putting the device on standby following the sending of the reading frame.

According to a fifth aspect of the invention, the invention relates to a computer program comprising instructions for implementing, by a device, the method according to the first aspect or the method according to the third aspect, when said program is executed by a calculation unit of said device.

According to a sixth aspect of the invention, the invention relates to storage means, storing a computer program comprising instructions for implementing, by a device, the method according to the first aspect or the method according to the third aspect, when said program is executed by a calculation unit of said device.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
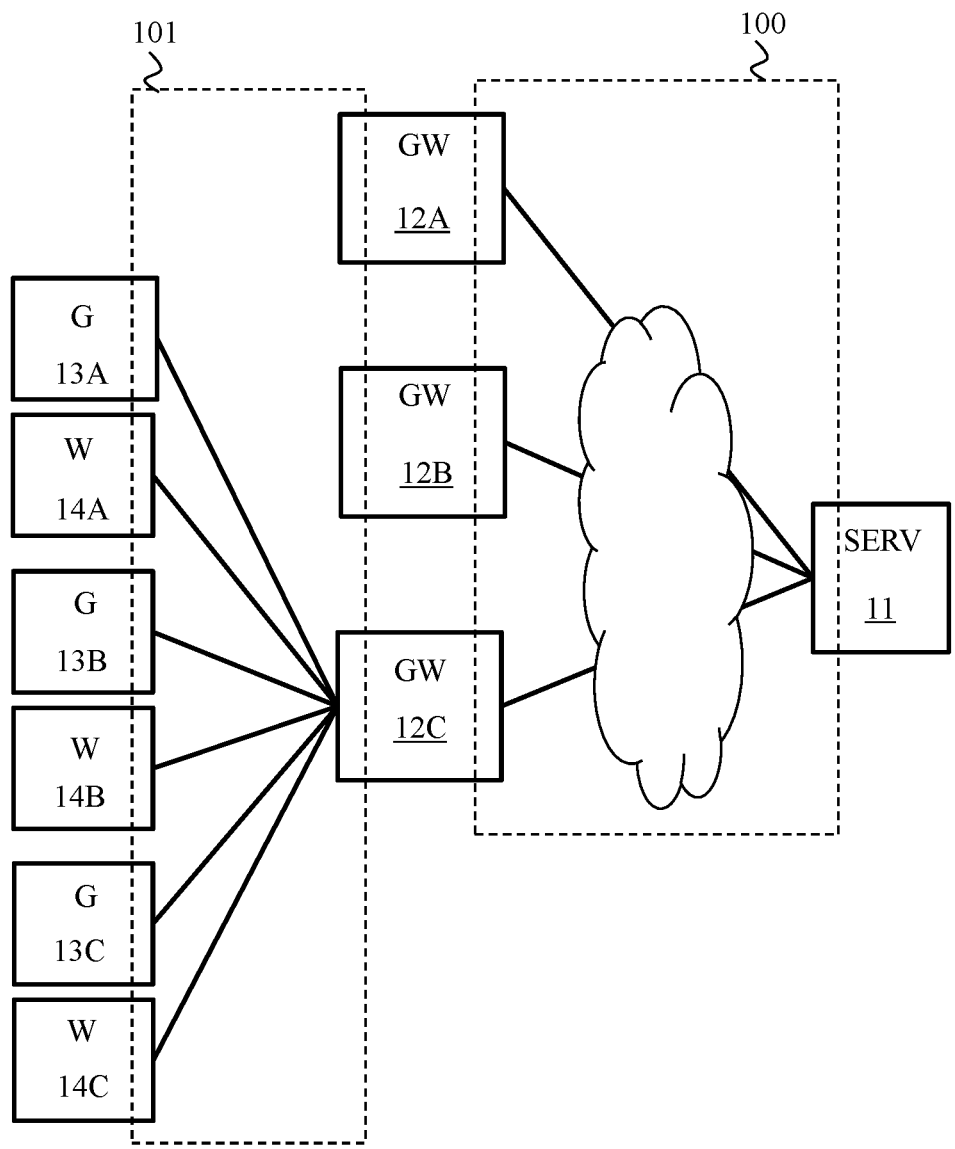
FIG. 1 illustrates schematically a communication system, supporting an automated remote reading of information representing fluid consumption measured by fluid meters, wherein the present invention is implemented.

FIG. 1 illustrates schematically a communication system supporting an automated remote reading of information representing fluid consumption measured by fluid meters, wherein the present invention is implemented.

The communication system further comprises a management entity that is in particularly responsible for processing in a centralised manner information representing a consumption of fluids coming from fluid meters of said system.

The management entity takes the form of a server 11, or a set of servers, to which gateways 12A, 12B and 12C are connected by means of a communication network 100. The communication network 100 is for example a wireless communication network, for example of the GPRS (General Packet Radio Service), UMTS (Universal Mobile Telecommunication System) or LTE (Long-Term Evolution) type. The communication network 100 may in a variant be a cable communication link.

Each gateway is connected to a set of fluid meters. In FIG. 1, we have shown only fluid meters of the gas meter type 13A, 13B and 13C and fluid meters of the water meter type 14A, 14B and 14C attached to the gateway 12C.

A communication network 101 enables the fluid meters to communicate with the gateway to which they are attached. In one embodiment, the communication network 101 is based on the WM-Bus communication standard.

Figure 4:
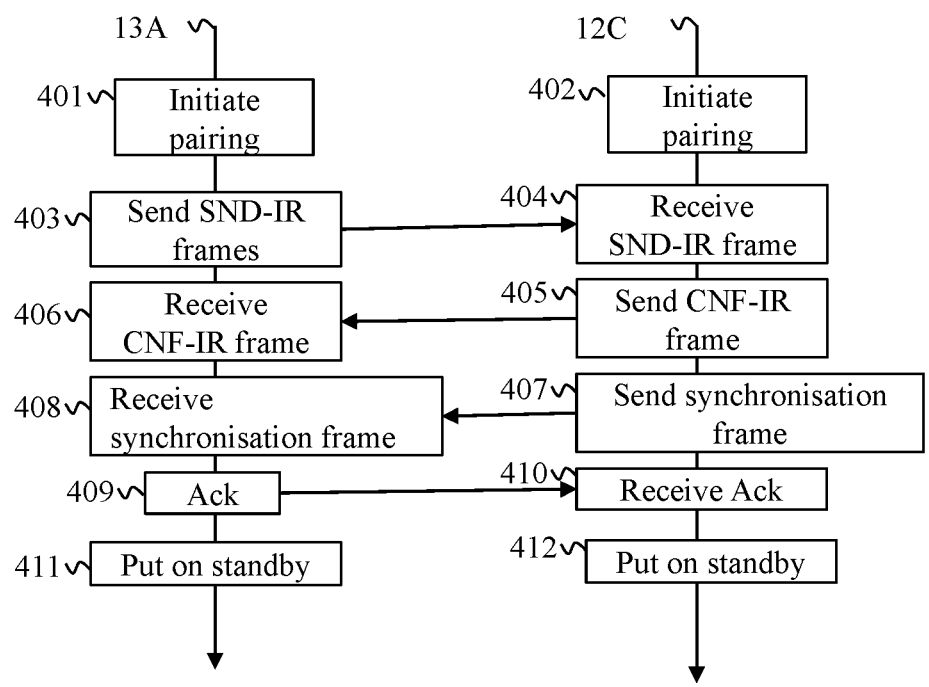
FIG. 4 illustrates schematically a procedure for pairing between a fluid meter and a gateway.
Figure 5:
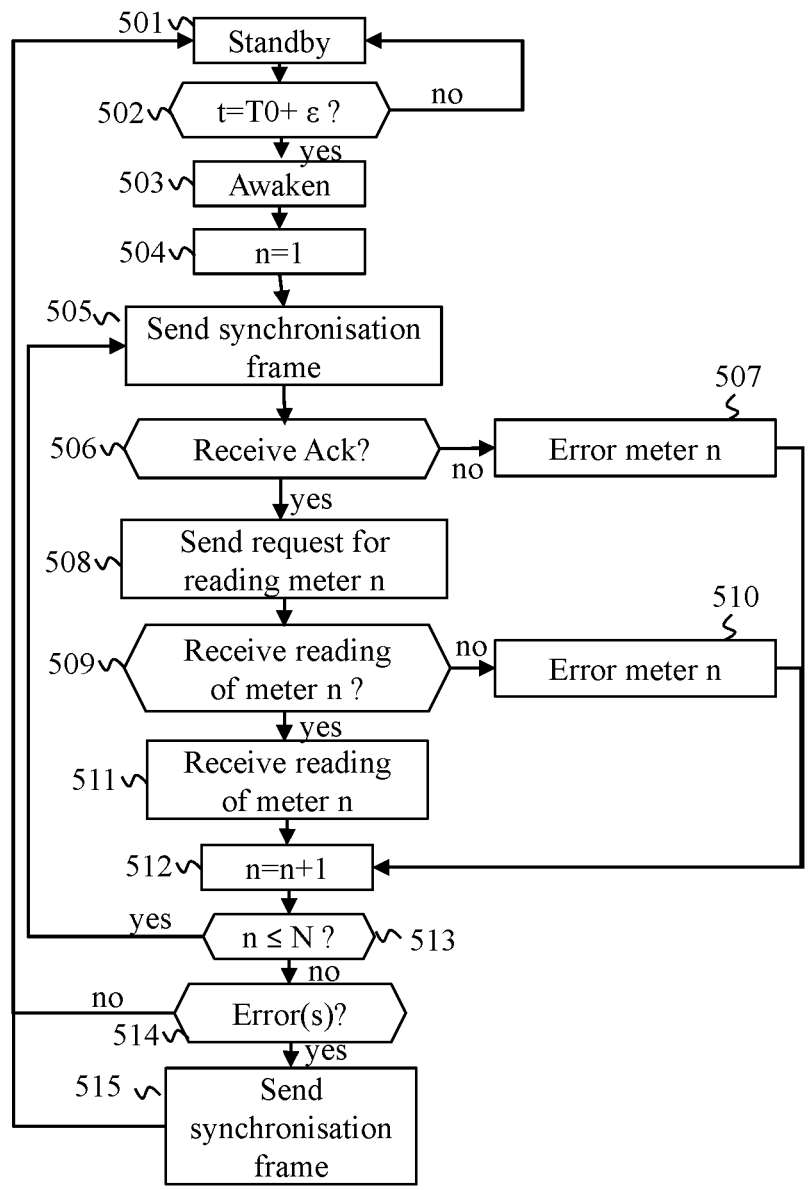
FIG. 5 illustrates schematically a first part of a fluid-meter reading method implemented by a gateway.
Figure 6:
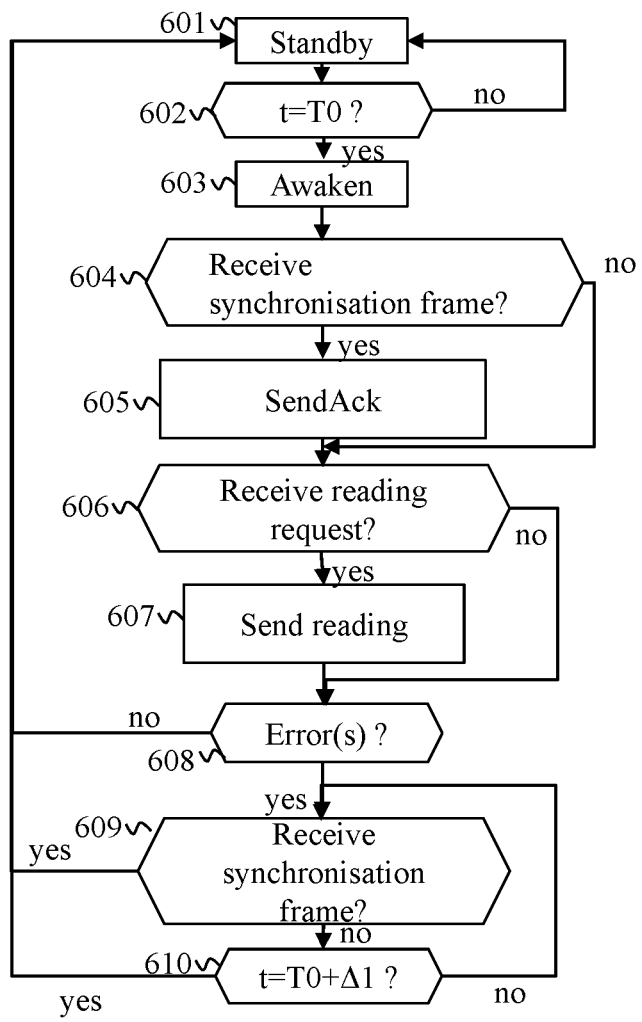
FIG. 6 illustrates schematically a second part of a fluid-meter reading method implemented by a fluid meter.

Each gateway collects information representing fluid consumption coming from fluid meters that are attached to it in accordance with a method described in relation to FIGS. 4, 5 and 6. Each gateway is then responsible for transferring the information collected to the management entity 11 using the communication network 100.

In one embodiment, the communication network 101 is based on the LoRa (registered trade mark) (Long Range) technology.

Figure 2:
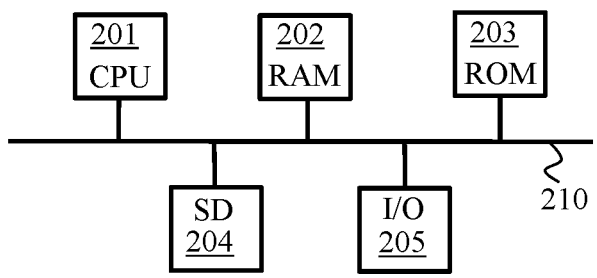
FIG. 2 illustrates schematically an example of hardware arrangement of a control module used in the communication system.

FIG. 2 illustrates schematically an example of hardware architecture of a control module used in the communication system of FIG. 1. Such a control module is found in each gateway 12A, 12B and 12C and in each fluid meter 13A, 13B and 13C and 14A, 14B and 14C as detailed hereinafter in relation to FIGS. 3A and 3B.

The example of hardware architecture presented comprises, connected by a communication bus 210: a processor CPU 201; a random access memory RAM 202; a read only memory ROM 203 or a flash memory; a storage unit or a storage medium reader, such as an SD (Secure Digital) card reader 204; and a set of input/output interfaces I/O 205. The set of input/output interfaces I/O 205 enables the control module to communicate with other components within one and the same device, as detailed hereinafter in relation to FIGS. 3A and 3.

The processor CPU 201 is capable of executing instructions loaded in the RAM memory 202 from the ROM memory 203, from an external memory (such as an SD card), from a storage medium or from a communication network. On powering up, the processor CPU 201 is capable of reading instructions from the RAM memory 202 and executing them. These instructions form a computer program causing the implementation, by the processor CPU 201, of all or some of the methods and steps described hereinafter in relation to FIGS. 4, 5 and 6.

Thus all or some of the methods and steps described in relation to FIGS. 4, 5 and 6 can be implemented in software form by executing a set of instructions by a programmable machine, such as a DSP (digital signal processor) or a microcontroller or a processor. All or some of the methods and steps described in relation to FIGS. 4, 5 and 6 can also be implemented in hardware form by a machine or a dedicated component, such as FPGA (field-programmable gate array) or an ASIC (application-specific integrated circuit). Thus the control module comprises electronic circuitry adapted and configured for implementing the methods and steps described in relation to FIGS. 4, 5 and 6.

Figure 3A:
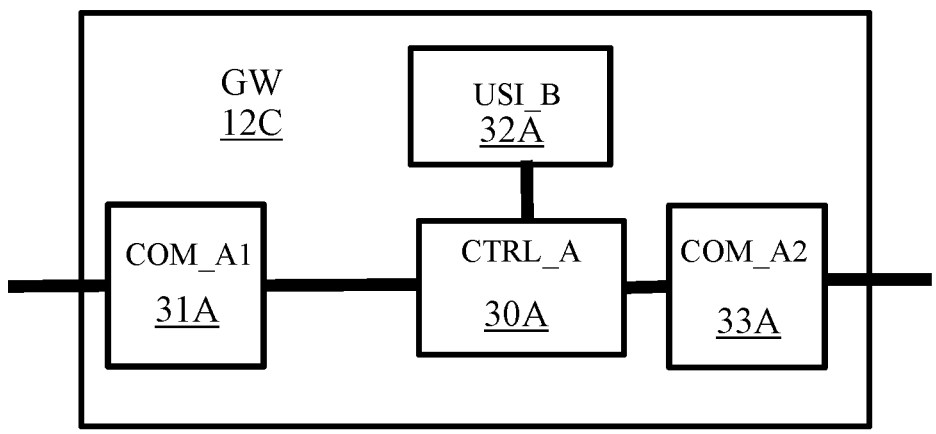
FIG. 3A illustrates schematically an arrangement of a gateway of the communication system.

FIG. 3A illustrates schematically an arrangement of a gateway of the communication system.

We take here the example of the gateway 12C, but the gateways 12A and 12B are identical. The gateway 12C comprises a control module 30A as described in relation to FIG. 2. The control module 30A is responsible for supervising the operation of the gateway 12C.

The gateway 12C further comprises a first communication module 31A intended to make it possible to communicate with the fluid meters attached to the gateway 12C via the communication network 101.

The gateway 12C further comprises a second communication module 33A intended to make it possible to communicate with the management entity via the communication network 100.

The gateway 12C may further comprise a user interface module 32A adapted for interacting with users. The user interface module 32A comprises for example a button for activating a procedure for pairing between the gateway 12C and a fluid meter.

Figure 3B:
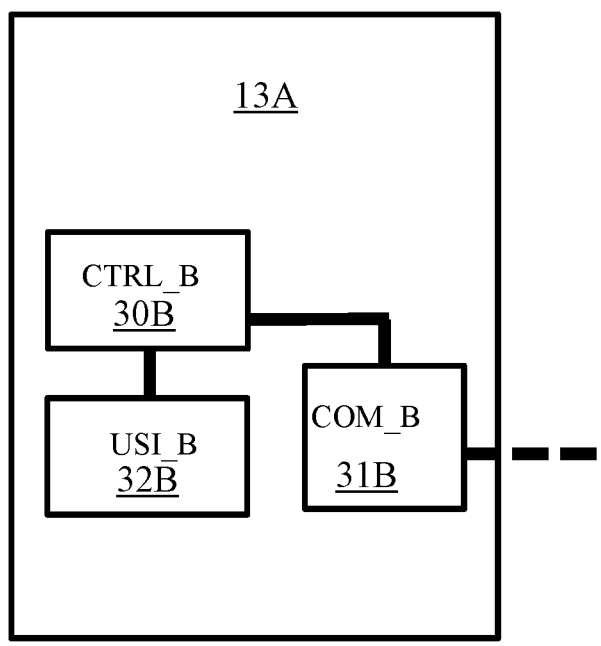
FIG. 3B illustrates schematically an arrangement of a fluid meter of the communication system.

FIG. 3B illustrates schematically an arrangement of a fluid meter of the communication system. In FIG. 3B, we take the example of the fluid meter 13A, but such an arrangement is found again in the fluid meters 13B, 13C, 14A, 14B and 14C.

The fluid meter 13A comprises a control module 30B identical to the control module described in relation to FIG. 2. The control module 30B is responsible for supervising the operation of the fluid meter 13A.

The fluid meter 13A may further comprise a user interface module 32B adapted for interacting with users. The user interface module 32B is for example a button for activating a procedure for pairing the fluid meter 13A with the gateway 12C to which the fluid meter 13A is attached.

The fluid meter 13A further comprises a communication module 31B intended to make it possible to communicate with the gateway 12C via the communication network 101.

FIG. 4 illustrates schematically a procedure for pairing between a fluid meter and a gateway.

In FIG. 4, we take the example of exchanges between the gateway 12C and the fluid meter 13A. The same pairing procedure is implemented for pairing the meter 13B (or respectively 13B, 13C, 14A, 14B, 14C) with the gateway 12C.

All the exchanges between the gateway 12C and the fluid meter 13A use frames in accordance with the WM-Bus standard. The frames exchanged between the gateway 12C and the fluid meter 13A are hereinafter called WM-Bus frames. The WM-Bus frames going in the direction from fluid meter 13A to the gateway 12C are hereinafter called uplink WM-Bus frames and the WM-Bus frames going in the direction from gateway 12C to the fluid meter 13A, downlink WM-Bus frames.

In a step 401, a user presses the button of the user interface 32B of the fluid meter 13A. The control module 30B of the fluid meter 13A captures this action on the button.

In a step 403, the control module 30B causes the sending, by the communication module 31B, of signalling messages during a predefined period, each signalling message taking the form of a signalling uplink WM-Bus frame, i.e. a frame in accordance with the WM-Bus standard comprising an SND-IR symbol as defined in table 24 of the standard. For example, the predefined period lasts for fifteen minutes. Each signalling uplink WM-Bus frame comprises an identifier of the fluid meter in the form of a field A_field in six bytes defined by the WM-Bus standard. This identifier is unique for each meter. It should be noted that this identifier is also used in the downlink WM-Bus frames intended for the meters.

In a step 402, the user presses the button of the user interface 32A of the gateway 12C. The control module 30A of the gateway 12C captures this action on the button. At this stage the control module 30A knows that it is entering a pairing phase and that it will receive at least one signalling uplink WM-Bus frame.

In a step 404, the gateway 12C receives at least one signalling uplink WM-Bus frame by means of its communication module 31A.

In a step 405, following the reception of the signalling uplink WM-Bus frame, the control module 30A of the gateway 12C causes a sending of a so-called pairing-successful downlink WM-Bus frame, i.e. a frame in accordance with the WM-Bus standard comprising a symbol CNF-IR as defined in table 25 of the WM-Bus standard, to the fluid meter 13A. Each pairing-successful downlink WM-Bus frame comprises an identifier of the fluid meter for which this frame is intended in the form of a field A_field.

In a step 406, the fluid meter 13A receives the pairing-successful downlink WM-Bus frame by means of its communication module 31B. The control module 30B deduces from this that the gateway 12C and the fluid meter 13A are now paired.

In a step 407, the control module 30A causes a sending by the gateway 12C, by means of the communication module 31A, of a so-called synchronisation downlink WM-Bus frame. Each synchronisation downlink WM-Bus frame comprises an identifier of the fluid meter for which this frame is intended in the form of a field A_field. A synchronisation downlink WM-Bus frame comprises, in the part thereof corresponding to the application layer according to the OSI (Open Systems Interconnection) model, a command byte equal to the hexadecimal value 0x01 and a payload of six bytes comprising timestamp information enabling the time of an internal clock of the fluid meter 13A to be set and information representing the next wake-up time for the gateway 12C. The timestamp information comprises:
one byte representing an hour value;
one byte representing a minutes value;
one byte representing a seconds value;
one byte representing a day value;
one byte representing a month value;
one byte representing a year value.

The information representing the next wake-up time for the gateway 12C comprises:
one byte representing an hour value;
one byte representing a minutes value;
one byte representing a seconds value;
one byte representing a day value;
one byte representing a month value;
one byte representing a year value.

The next wake-up time for the gateway 12C corresponds to a start time of a period, referred to as a meter reading period, during which the gateway 12C will read the information representing a fluid consumption of each meter that is attached thereto. In one embodiment, the start of each meter reading period is done to a timetable (hour, minute, second) predefined each day, for example at 04 H00 min00 s. In another embodiment, this timetable is determined randomly.

In a step 408, the fluid meter 13A receives the synchronisation downlink WM-Bus frame by means of its communication module 31B. The control module 30B then sets the time of an internal clock included in the fluid meter 13A using the timestamp information and keeps the information representing the next wake-up time of the gateway 12C.

In a step 409, the fluid meter 13A transmits a so-called acknowledgement-of-reception uplink WM-Bus frame, i.e. comprising a symbol ACC-DMD as described in table 24 of the WM-Bus standard.

In a step 410, the gateway 12C receives the acknowledgement-of-reception uplink WM-Bus frame and the control module 30A puts the gateway 12C on standby in a step 412 until the next fixed meter reading period in the synchronisation downlink WM-Bus frame.

In a step 411, the control module 30B puts the fluid meter 13A on standby until the start time of the next meter reading period indicated in the synchronisation downlink WM-Bus frame.

The method in FIG. 4 therefore makes it possible to obtain a set of fluid meters paired with the gateway 12C.

FIG. 5 illustrates schematically a first part of a fluid-meter reading method implemented by a gateway.

By means of the method in FIG. 5, the gateway 12C will read each meter that is attached to it without risk of collision between frames.

It is supposed here that a number N of fluid meters are paired with the gateway 12C. In one embodiment, these fluid meters are bidirectional, i.e. they can send and receive frames.

In a step 501, the gateway 12C is on standby. Moreover, in the gateway 12C, each fluid meter is associated with an order number lying between 1 and N. An order number was for example attributed to each fluid meter by the gateway 12C during the pairing phase. It is then considered that the fluid meters thus associated with an order number form an ordered list of meters paired with the gateway 12C. During the pairing phase, the gateway 12C knows the number of fluid meters already paired and increments this number by one unit at each new pairing. The number thus incremented corresponds to the order number of the last fluid meter paired. Each order number is thus associated with an address of a corresponding fluid meter.

In a step 502, the control module 30A of the gateway 12C compares a current time t with the start time of the next meter reading period T0. In one embodiment, to take into account any clock differences between the gateway 12C and the fluid meters that are attached thereto, the control module 30A adds a correction value ε to the time T0. In one embodiment, ε=3 s.

If the current time t corresponds to the start time of the next meter reading period T0 (or T0+ε), the control module 30A awakens the gateway 12C in a step 503. Otherwise the gateway 12C remains on standby. In a step 504, the control module 30A initialises a variable n to 1. The variable n serves to run through the ordered list of the N fluid meters attached to the gateway 12C. The fluid meters are therefore run through in the order of their order number.

In a step 505, the control module 30A causes a sending of a synchronisation downlink WM-Bus frame comprising timestamp information corresponding to the instant of sending the frame and information representing the start time of the next meter reading period T0 intended for the fluid meter corresponding to an order number of value n. It is then noted that, during a meter reading period, the gateway 12C transmits a start time of the next meter reading period T0 identical to each fluid meter in the ordered list.

In a step 506, the control module 30A checks whether the gateway 12C has received an acknowledgement-of-reception uplink WM-Bus frame. If at the end of a predetermined period Δ following the sending of the synchronisation downlink WM-Bus frame the gateway 12C has not received an acknowledgement of reception uplink WM-Bus frame from the fluid meter of order number n, the control module 30A considers that the fluid meter of order number n is erroneous during a step 507. In one embodiment, the predetermined duration Δ is equal to 3 seconds. The step 507 is then followed by a step 512.

If the gateway 12C receives an acknowledgement-of-reception uplink WM-Bus frame from the fluid meter of order number n during the predetermined period Δ, the control module 30A causes the sending, during a step 508, of a so-called reading-request downlink WM-Bus frame, intended for the fluid meter of order number n. The reading-request downlink WM-Bus frame comprises, in a part corresponding to the application layer according to the OSI model, a command byte of value 0x02 and an empty payload. The reading-request downlink WM-Bus frame requests the fluid meter to which this request is addressed to supply to it information representing a fluid consumption measured by said fluid meter.

In a step 509, the control module 30A checks whether the gateway 12C has received a so-called reading uplink WM-Bus frame containing the information representing a fluid consumption requested. The reading uplink WM-Bus frame comprises, in a part corresponding to the application layer according to the OSI model, a command byte of value 0x02 and a payload of ten bytes representing the information representing a fluid consumption. The information representing a fluid consumption is composed of an index (also referred to as a metering value) representing a fluid consumption coded in four bytes and six timestamp bytes comprising:

one byte representing an hour value;
one byte representing a minutes value;
one byte representing a seconds value;
one byte representing a day value;
one byte representing a month value; and
one byte representing a year value.

If at the end of the predefined period Δ following the sending of the downlink WM-Bus frame requesting an index the gateway 12C does not receive a reading uplink WM-Bus frame coming from the fluid meter of order number n, the control module 30A considers that the fluid meter of order number n is in error in a step 510. The step 510 is followed by the step 512.

If the gateway 12C receives a reading uplink WM frame coming from the fluid meter of order number n, the gateway 12C retransmits the information representing a fluid consumption contained in this frame to the management entity 11 with an identifier of the fluid meter concerned in a step 511.

During the step 512, the control module 30A increments the variable n by one unit in order to pass to the following fluid meter in the ordered list.

In a step 513, the control module 30A compares the value of the variable n with the number of fluid meters N attached to the gateway 12C. If n≤N, the control module 30A returns to the step 505 to read a new fluid meter.

Otherwise the control module 30A checks whether fluid meters among the N fluid meters that are attached to it are in error. If no fluid meter is in error, the control module 30A returns to the step 501 and puts the gateway 12C on standby until the next meter reading period, the start time T0 of which is fixed during the step 505. It should be noted that the start time T0 is the same for all the fluid meters in one and the same ordered list.

If at least one fluid meter among the N fluid meters attached to the gateway 12C is in error, some fluid meters attached to the gateway 12C risk not having received the synchronisation downlink WM-Bus frame sent during the step 505. These fluid meters risk firstly no longer being synchronised with the gateway 12 and secondly not knowing the start time of the next meter reading period T0. To avoid this situation, in a step 515, the control module 30A causes a sending of a synchronisation downlink WM-Bus frame in broadcast mode to enable the fluid meters that are not in a situation of receiving this frame to receive it. The WM-Bus standard does not state how to transmit a frame in broadcast mode. In one embodiment, it is considered that the field A-field comprises a field identification number coded in four bytes among the six of the field A-field. To transmit a frame in broadcast mode, all the bits of the field identification number are set to 1.

In one embodiment, the steps 506, 507 and 508 are not performed. In this embodiment, the synchronisation downlink WM-Bus frame serves as a reading-request downlink WM-Bus frame and the reading uplink WM-Bus frame serves as a reception-acknowledgement uplink WM-Bus frame for acknowledging reception of the synchronisation downlink WM-Bus frame.

In one embodiment, the gateway 12C, in addition to reading the information representing fluid consumption of the bidirectional meters that are attached to it in accordance with the method described in FIG. 5, receives reading uplink WM-Bus frames from unidirectional fluid meters. These fluid meters are then desynchronised from the gateway 12C (they do not know the start time of the next meter reading period T0) and from the bidirectional fluid meters to which the method of FIG. 5 relates. The risk of a WM-Bus frame coming from a unidirectional fluid meter coming into collision with a WM-Bus frame exchanged between a bidirectional fluid meter and the gateway 11 is then high. To limit the risk of a bidirectional fluid meter to which the method of FIG. 5 relates no longer being synchronised with the gateway 12C or not receiving the start time of the next meter reading period T0, in the step 515 the control module 30A causes a sending of a plurality of synchronisation downlink WM-Bus frames in broadcast mode. For example, the control module 30A causes the sending of three synchronisation downlink WM-Bus frames at intervals of one second.

As we shall see hereinafter, each meter goes into active mode at the start time of the meter reading period T0 and goes on standby again as soon as its information representing a fluid consumption has been read. The fluid meters the order numbers of which are the lowest are read first, which enables them to go on standby quickly and thus to save more energy than the fluid meters having the highest order numbers. In one embodiment, in order better to distribute the consumption of energy in the fluid meters, the control module 30A modifies the order numbers at each meter reading period, i.e. modifies the order of the meters in the ordered list, so as to equalise the awake time of said meters. For example, each meter having an order number equal to i (i∈[2, N]) takes an order number equal to i−1, the fluid meter having the order number 1 taking the order number value N, seen from the gateway 12C.

In another embodiment, the control module 30A divides the meters attached to the gateway 12C into a plurality of ordered lists. For example, the control module 30A divides the meters attached to the gateway 12C into two ordered lists. The control module then defines a meter reading period for each ordered list, the periods thus defined being separate and less long than in the case of a single meter reading period. One advantage of this embodiment is that, each meter reading period being less long, this means that each meter remains awake for less time (half the time in the case of two ordered lists).

In one embodiment, the control module 30A does not put the gateway 12C on standby when all the fluid meters attached to this gateway have been read, or when the step 515 has been performed. In this embodiment, the meter reading period is of a duration D, for example equal to 120 seconds, the control module 30A puts the gateway on standby at the end of the period of duration D. The number of fluid meters N is then defined so that the gateway can read each fluid meter that is attached thereto during the period of duration D.

In one embodiment, when a fluid meter is in error over a predefined number of consecutive meter reading periods, for example equal to three, the control module 30A considers that it must proceed with a new pairing of this fluid meter and informs the management entity 11 thereof.

In one embodiment, during the implementation of the pairing method of FIG. 4, the gateway 12C requests an encryption key corresponding to the fluid meter currently being paired from the management entity 11. As soon as this key is obtained, it serves to encrypt all the exchanges between the gateway 12C and said fluid meter.

FIG. 6 illustrates schematically a second part of the fluid meter reading method implemented by a fluid meter.

In FIG. 6, we take the example of the fluid meter 13A, the other fluid meters attached to the gateway 12C operating in an identical manner.

In a step 601, the fluid meter 13A is on standby.

In a step 602, the control module 30B of the fluid meter 13A compares a current time t with the start time of the next meter reading period T0. This start time was obtained when a synchronisation frame was received, either during the implementation of the method of FIG. 4, or during a previous meter reading period.

If the current time t corresponds to the start time of the next meter reading period T0, the control module 30B awakens the fluid meter 13A in a step 603. Otherwise the fluid meter 13A remains on standby.

In a step 604, the control module 30B of the fluid meter 13A checks whether it has received a synchronisation downlink WM-Bus frame by means of its communication module 31B. The reception of a synchronisation downlink WM-Bus frame by the fluid meter 13A causes a sending of a reception-acknowledgement WM-Bus frame to the gateway 12C in a step 605. Moreover, in the step 605, the control module 30B keeps the start time of the next meter reading period contained in the synchronisation downlink WM-Bus frame and resynchronises an internal clock on the timestamp information contained in said synchronisation downlink WM-Bus frame.

In a step 606, which can follow the step 604 or the step 605 or be conjoint with the step 604, the control module 30B checks whether the fluid meter 13A has received a reading-request downlink WM-Bus frame from the gateway 12C. Reception of a reading-request downlink WM-Bus frame causes a sending by the fluid meter 13A of a reading uplink WM-Bus frame in a step 607. The step 607 is followed by a step 608.

If the fluid meter receives a reading-request downlink WM-Bus frame without having received a synchronisation downlink WM-Bus frame, the control module 30B notes that an error has occurred. Moreover, if the fluid meter 13A does not receive a reading-request downlink WM-Bus frame after a period δ following the reception of a synchronisation downlink WM-Bus frame, the control module 30B passes directly to the step 608, without noting an error.

In the step 608, the control module 30B checks whether an error has occurred. If no error has occurred, the control module 30B puts the fluid meter 13A on standby until the start time of the next meter reading period T0 that was indicated to it in the synchronisation downlink WM-Bus frame.

If an error has occurred, the control module 30B checks whether a synchronisation downlink WM-Bus frame sent in broadcast mode by the gateway 12C was received by the fluid meter 13A in a step 609. If a synchronisation downlink WM-Bus frame sent in broadcast mode is received, the control module 30B keeps the start time of the next meter-reading period contained in this frame and resynchronises an internal clock on the timestamp information contained in said frame.

If no synchronisation downlink WM-Bus frame sent in broadcast mode is received, the control module 30B, in a step 610, compares the current time t with a time calculated from the start time of the current meter reading period. This time is calculated by adding a predefined period Δ1 to the start time T0 of the current meter reading period. The predefined period Δ1 is for example 48 hours. If the time t is less than the time T0+Δ1, the control module 30B returns to the step 609 and continues to await reception of a synchronisation downlink WM-Bus frame sent in broadcast mode by the gateway 12C. If the time t attains the time T0+Δ1, in this case the control module 30B puts the fluid meter 12C on standby by returning to the step 601. The control module 30B in fact deduces from the non-reception of at least one synchronisation downlink WM-Bus frame during the predefined period Δ1 that the communications with the gateway 12B are out of service and that consequently it is preferable to go on standby in order to limit its energy consumption. In this case, the gateway 12C will realise that the fluid meter 13A is not responding and will warn the management entity 11.

The invention claimed is:

1. A method for an automated remote reading of a plurality of fluid meters implemented in a system comprising the plurality of fluid meters, referred to as meters, each meter measuring a fluid consumption, and at least one gateway of a plurality of gateways, each gateway of the plurality of gateways being able to exchange frames in accordance with a wireless communication standard with the plurality of fluid meters via a first communication network, and to communicate with a management entity responsible for processing in a centralised manner information representing a fluid consumption, referred to as readings, coming from the meters via a second network, the method comprising, for said each gateway:

obtaining at least one ordered list of a plurality of ordered lists of the meters paired with said each gateway, each meter in each list of the plurality of ordered lists having been paired by implementing a pairing procedure during which said each gateway sent to said each meter a frame, referred to as a synchronisation frame, each synchronisation frame of a plurality of synchronisation frames comprising for said each list timestamp information enabling a time of said each meter to be set and information representing one and same start time of a next period of reading the meters by said each gateway, said each gateway being on standby outside each reading period of a plurality of reading periods, said each meter waking up at said same start time indicated in the synchronisation frame;

for said each list and during said each reading period corresponding to said each list:

going into active mode and running through said each list in order, and, for said each meter:

sending the synchronisation frame to said each meter, the same start time, referred to as a next start time, contained in said synchronisation frame being identical for said each meter in said each list;

following reception of an acknowledgement for the synchronisation frame, sending a frame requesting said each meter to provide a reading; and passing to a following meter in said each list following reception of the frame requesting said each meter to provide the reading, referred to as a reading frame, containing the requested said each meter to provide the reading, said each meter going on standby following the sending of the reading frame; and going on standby following the running through of said each list until the next start time.

2. The method according to claim 1, wherein, when at least one meter of the meters in the at least one ordered list of the plurality of ordered lists does not send the acknowledgement following the sending of the synchronisation frame intended for the at least one meter and/or does not send the reading frame following the sending of the frame requesting said each meter providing the reading intended for the at least one meter, following the running through of said each list, said each gateway sends at least one synchronisation frame in broadcast mode, said each meter remaining awake as long as a condition of putting said each meter on standby is not respected, the condition of putting said each meter on standby being respected when said each meter receives the synchronisation frame.

3. The method according to claim 1, wherein the synchronisation frame serves as the frame requesting said each meter providing the reading and the reading frame serves as an acknowledgement frame.

4. The method according to claim 1, wherein said each gateway modifies an order of the meters in said each list at said each reading period so as to balance a wake-up time of said meters.

5. The method according to claim 1, wherein, when said each meter in the at least one ordered list does not return the acknowledgement following the sending of the synchronisation frame intended for said each meter and/or does not return the reading frame following the sending of the frame requesting said each meter providing the reading intended for said each meter over a predefined number of consecutive meter reading periods, said each gateway considers that the pairing procedure must be reapplied for said each meter.

6. A device of a gateway type, referred as a gateway making it possible to remotely read a plurality of fluid meters in an automated manner in a system comprising the plurality of fluid meters, referred to as meters, each meter measuring a fluid consumption, said device being able to exchange frames according to a wireless communication standard with the plurality of fluid meters via a first communication network, and to communicate with a management entity responsible for processing in a centralised manner information representing a consumption of fluids, referred to as readings, coming from the meters via a second network, the device comprising:

obtaining means for obtaining at least one ordered list of a plurality of ordered lists of the meters paired with said gateway, said each meter in each list of the plurality of ordered lists having been paired by implementing a pairing procedure during which said device sent to said each meter a frame, referred to as a synchronisation frame, each synchronisation frame of a plurality of synchronisation frames comprising for said each list timestamp information enabling a time of said each meter to be set and information representing one and a same start time of a next period of reading the meters by said device, said device being on standby outside each reading period of a plurality of reading periods, said each meter waking up at said same start time indicated in the synchronisation frame;

means implemented for said each list and during said each reading period corresponding to said each list comprising:

control means for going into active mode and running-through means for running through said each list in order, and, for said each meter;

communication means for sending the synchronisation frame to said each meter, the start time, referred to as a next start time, contained in said synchronisation frame being identical for said each meter in said each list;

communication means for receiving an acknowledgement for the synchronisation frame, and communication means for sending the frame requesting said each meter to provide a reading, following a reception of the acknowledgement;

communication means for receiving the frame, referred to as a reading frame, containing a requested reading; and control means for passing to a following meter in said each list following a reception of the reading frame, said each meter going on standby following the sending the frame requesting said each meter to provide the reading; and control means for going on standby following the running through of said each list until the next start time.

7. A method for an automated remote reading of a plurality of fluid meters implemented in a system comprising the plurality of fluid meters, referred to as meters, each meter measuring a fluid consumption, and a gateway, the gateway being able to exchange frames according to a wireless communication standard with the plurality of fluid meters via a first communication network, and to communicate with a management entity responsible for processing in a centralised manner information representing the fluid consumption, referred to as readings, coming from the meters via a second network, the gateway defining meter reading periods during which it performs meter readings, the method comprising, for each meter and each meter reading period:

obtaining a first start time of a meter reading period, the first start time having been obtained when a synchronisation frame is received, each synchronisation frame of a plurality of synchronisation frames comprising timestamp information enabling a time of said each meter to be set and information representing a start time of a next period of reading the meters by the gateway, said time of said each meter being identical for a set of the meters in an ordered list of the meters paired with said gateway, each synchronisation frame having been transmitted either during an implementation of a procedure of pairing between said each meter and said gateway, or during a previous meter reading period;

waking up at the first start time;

in an event of reception of a synchronisation frame, keeping the start time, referred to as a second start time, indicated in the synchronisation frame and transmitting an acknowledgement to the gateway for said synchronisation frame;

in an event of reception of a frame requesting said each meter to provide a reading, sending to the gateway the frame, referred to as a reading frame, containing the requested said each meter to provide the reading, a time of sending the synchronisation frame and the frame requesting said each meter to providing the reading in the meter reading period being dependent on a position of said each meter in the ordered list; and going on standby following the sending of the reading frame until the second start time.

8. The method according to claim 7, wherein, if one of the fluid meters receives the frame requesting said each meter to provide the reading without previously having received the synchronisation frame, said each meter remains awake as long as a condition of putting on standby is not respected, the condition of putting on standby being respected when said each meter receives the synchronisation frame sent in broadcast mode by the gateway.

9. A device of a fluid meter type, referred to as a meter, included in a system comprising a plurality of meters, each meter measuring a fluid consumption, and a gateway, the gateway being able to exchange data according to a wireless communication standard with the plurality of meters via a first communication network, and to communicate with a management entity responsible for processing in a centralised manner information representing the fluid consumption, referred to as readings, coming from the meters via a second network, the gateway defining meter reading periods during which it makes meter readings, the device comprising:

obtaining means for obtaining a first start time of a meter reading period, the first start time having been obtained when a synchronisation frame is received, each synchronisation frame of a plurality of synchronisation frames comprising timestamp information enabling a time of said device to be set and information representing a start time of a next period of reading the meters by the gateway, said time being identical for a set of the meters in an ordered list of the meters paired with said gateway, each synchronisation frame having been transmitted either during an implementation of a procedure of pairing between the device and said gateway, or during a previous meter reading period;

control means for waking up the device at the first start time;

communication means for receiving the synchronisation frame;

storage means for storing a start time, referred to as a second start time, indicated in the synchronisation frame, and communication means for transmitting an acknowledgement to the gateway in an event of reception of the synchronisation frame;

communication means for receiving a frame requesting said device to provide a reading;

communication means for sending to the gateway the frame, referred to as a reading frame, containing the reading in an event of reception of the frame requesting said device to provide the reading, the time of sending the synchronisation frame and the frame requesting providing the reading in the meter reading period being dependent on a position of said device in the ordered list; and control means for putting the device on standby following the sending of the reading frame.

10. A non-transitory storage medium storing a computer program comprising instructions for implementing, by a device, in the method according to claim 1, when said computer program is executed by a calculation unit of said device.

11. A non-transitory storage medium storing a computer program comprising instructions for implementing, by a device, in the method according to claim 7, when said computer program is executed by a calculation unit of said device.

* * * * *